R. D. THOMSON.
METHOD OF WELDING.
APPLICATION FILED MAY 12, 1911.
1,078,226.
Patented Nov. 11, 1913.
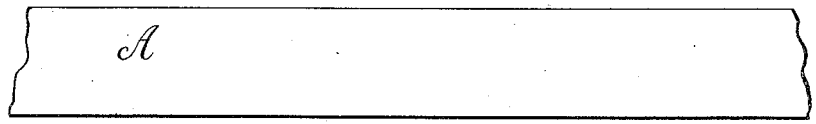
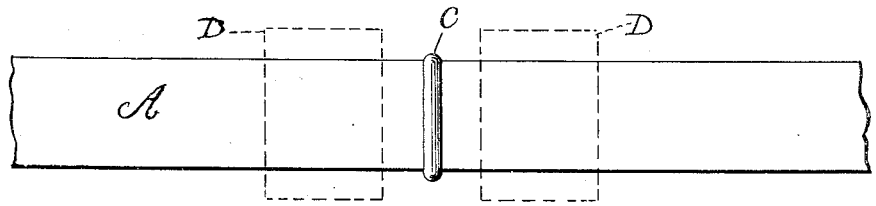
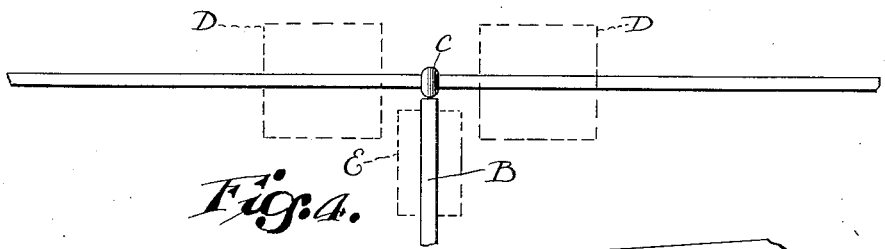
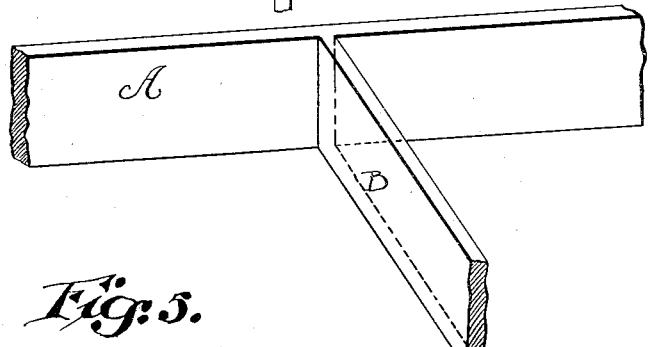
INVENTOR
ROLAND DAVIS THOMSON.
BY
ATTORNEYS

UNITED STATES PATENT OFFICE.

ROLAND DAVIS THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

METHOD OF WELDING.

1,078,226.  Specification of Letters Patent.  Patented Nov. 11, 1913.

Application filed May 12, 1911. Serial No. 626,747.

*To all whom it may concern:*

Be it known that I, ROLAND D. THOMSON, a citizen of the United States, and a resident of Swampscott, in the county of Essex and State of Massachusetts, have invented certain new and useful Improvements in Methods of Welding, of which the following is a specification.

My invention relates to methods of welding in which a heating electric current and pressure are employed as in the ordinary processes of electric welding.

The invention relates more particularly to an improved method of forming an electrically welded joint between the side of one piece and another piece, the latter being joined by its end or any other portion of its surfaces to form either a T-weld or any other form of electric weld. In the case of a T-weld the angle at which the leg of the T is joined may obviously depart from a right-angle.

The object of my invention is to avoid the necessity of specially preparing or forming one of the pieces apart from or preliminarily to the operation of making the weld.

The invention will be described with reference to the production of a T-weld or the welding of one piece of stock by a butt-weld at an angle to the side of another.

In the accompanying drawings Figure 1 represents the piece to the side of which another piece is to be welded in its blank condition. Fig. 2 represents the same piece at the first stage of the process forming my invention. Fig. 3 shows the piece as assembled in proper juxtaposition to the other piece to be welded thereto. Fig. 4 shows in perspective the pieces as welded to form a T-weld. Fig. 5 illustrates a modification.

In the drawings, A represents the one piece to whose side the other piece is to be welded and B the second piece to be welded to the piece A by a butt T-weld.

In describing my invention I will assume that the welding is a welding of the end of the piece B to the side of the piece A but my invention is not confined to an end or butt-welding and may be practised by the welding of other surfaces of the piece B or piece of any other form to the piece A.

To produce a welding in accordance with my invention, the piece A is subjected to heating electric current localized at the part thereof at which the weld is to be formed and is subjected to end pressure to upset the same and form a bur or projection C thereon, which affords a projection by which the current may be localized at the point of welding in the subsequent stages of the operation, according to my invention. This upsetting may be done in an electric welding machine of any proper character having clamps adapted to grasp the piece A at opposite sides of and close to the section which is to be upset, said clamps affording the means for passing current through the section to be heated. These clamps or similar devices for passing current through the heated section and subjecting the bar or piece A to the upsetting or end pressure, are indicated merely in dotted outline at D. The piece B is welded to the piece A by bringing the same into engagement with the upset and subjecting the parts to pressure while the current is passed from one to the other, in the usual or any desired way. Fig. 3 shows the parts as arranged or assembled for this stage of the operation, a clamp or electrode for holding part B and subjecting it to pressure while passing current through it if desired being indicated in typical form and in dotted outline at E. The part A is shown in this figure as arranged in the clamps D by which the upset projection C is made.

In practising my invention the parts would be assembled with the part B engaged with the side of the part A or at such a slight distance therefrom that on the application of pressure to the part A the upset or enlargement caused to appear thereon by the pressure through clamps D would quickly engage the piece or part B. Upon the application then of pressure endwise to the piece A and pressure to the piece B, tending to engage it with the side of the piece A or the projection therefrom and the simultaneous passage of current through the part A and the part B, one or both, a weld will be formed between the heated bur or projection C and the end of the piece B.

In practising the invention it may be some times desirable to form the projection which localizes the weld by so manipulating the stock as to cause the projection to be formed only on the side thereof to which the second piece of stock is to be attached. By this means the necessity for grinding of the bur at the back may be avoided.

While I have so far described the piece A as being a single piece of stock it is obvious that it might consist of two pieces originally butted together where the bur or projection C is to be formed, so that in effect a butt-weld of the two portions of the piece A could be made in the operation of forming the T-weld or other weld, according to my invention. It will be therefore understood that in the succeeding claim I include by the term "piece" or "piece of stock" a piece A whether formed of one continuous piece originally or of two pieces which are joined together as one piece at the projection, in the operation of forming the bur or projection. When said piece of stock A is so formed of two pieces, it becomes easier to localize the projection on one side thereof by properly forming the ends thereof where they abut, as for instance by forming them at an angle to cause them to first abut on the side where the projection is to be formed and in the manner indicated in Fig. 5.

What I claim as my invention is:

The herein described method of welding the end of one piece of stock at an angle to the side of another, consisting in subjecting the latter to end pressure and heating current to form a welding projection on the side thereof and at the same time welding the first-named piece to the other by said welding projection.

Signed at Lynn in the county of Essex and State of Massachusetts this 6th day of May A. D. 1911.

ROLAND DAVIS THOMSON.

Witnesses:
W. H. HODGES,
J. C. SANDER.